United States Patent [19]
Lindquist

[11] Patent Number: 5,951,223
[45] Date of Patent: Sep. 14, 1999

[54] SELF-RETAINING SNAP-IN CLIP

[75] Inventor: Carl E. Lindquist, Bridgewater, N.J.

[73] Assignee: San-O Industrial Corporation, Holbrook, N.Y.

[21] Appl. No.: 09/046,929

[22] Filed: Mar. 23, 1998

[51] Int. Cl.[6] .............................. F16B 37/02; F16B 37/04
[52] U.S. Cl. .......................... 411/175; 411/104; 411/112; 411/999
[58] Field of Search ......................... 411/111, 112, 113, 411/104, 174, 175, 427, 999

[56] References Cited

U.S. PATENT DOCUMENTS

| | | | |
|---|---|---|---|
| 2,465,326 | 3/1949 | Lepore | 411/112 X |
| 3,797,548 | 3/1974 | Barnett et al. | 411/174 X |
| 4,408,939 | 10/1983 | Graff et al. | 411/174 X |
| 5,026,235 | 6/1991 | Muller et al. | 411/175 X |
| 5,695,296 | 12/1997 | Miura | 411/174 X |

*Primary Examiner*—Neill Wilson

[57] ABSTRACT

A self-retaining snap-in clip is provided for securely mounting a fuse holder with mounting tabs onto the panel of an equipment enclosure or frame mounted drawer. The clip has a body portion having a pair of spaced legs and a base connecting the legs together. A locking leg extends upwardly from one of the legs away from the other leg and a holding means on the locking leg serves to securely engage the fuse holder with the clip.

15 Claims, 1 Drawing Sheet

SELF-RETAINING SNAP-IN CLIP

FIELD OF THE INVENTION

This invention relates generally to fastening means to fasten fuse holders onto a panel such as the panel of an equipment enclosure or frame mounted drawer. It is particularly related to clips which are employed with fuse holders having mounting tabs and is more specifically related to self-retaining, snap-in clips, i.e., the type of clips that can be snapped in to securely fasten the fuse holder mounting tabs to the equipment enclosure or frame mounted drawer panel either temporarily or permanently.

BACKGROUND OF THE INVENTION

At the present, fuse holders having mounting tabs are mounted on the panel of an enclosure or frame mounted drawer by conventional fastening means such as, for example, standard nuts and bolts. The mounting tabs are usually molded components of the fuse holder body and are provided with apertures which align with corresponding apertures in the equipment enclosure or frame mounted drawer panel. A washer is placed between the nut and the fuse holder mounting flange in order to more evenly spread the mechanical force and prevent cracking of the plastic flange. In actual assembly, this method of securing the fuse holder onto the equipment enclosure or frame mounted drawer panel is slow and time consuming. A more rapid assembly means is desired for mounting of a fuse holder on a panel.

Accordingly, it is an object of the present invention to provide a fastening means which lends itself to a more rapid and efficient method of mounting a fuse holder on an equipment enclosure or frame mounted drawer panel for a permanent or temporary fastening of the fuse holder to the panel.

It is a further object of this invention to provide a uniquely constructed clip which is especially adapted for securely mounting a fuse holder having mounting tabs onto the panel of the enclosure or frame mounted drawer.

It is still another object of this invention to provide a self-retaining snap-in clip for securely mounting a fuse holder to a panel without the danger of cracking of the fuse holder and compromising the integrity of the assembly.

The foregoing and other features and advantages of the present invention will be more clearly appreciated by reference to the ensuing description and the accompanying drawings.

SUMMARY OF THE INVENTION

In accordance with the present invention, there is provided a self-retaining snap-in clip for securing a holder body to an equipment enclosure or frame mounted drawer panel. The clip comprises a body portion having a pair of spaced first and second legs, a base which connects said legs together and upstanding locking leg which extends upwardly from said first leg in a direction away from said second leg. A holding means such as tynes are formed on the locking leg and the remaining portions of the clip are adapted to engage the top and bottom surfaces of a mounting tab of a fuse holder which is to be secured on the panel.

BRIEF DESCRIPTION OF THE DRAWINGS

In the drawings wherein like reference numerals designate like parts.

DETAILED DESCRIPTION OF INVENTION

Figure 1:
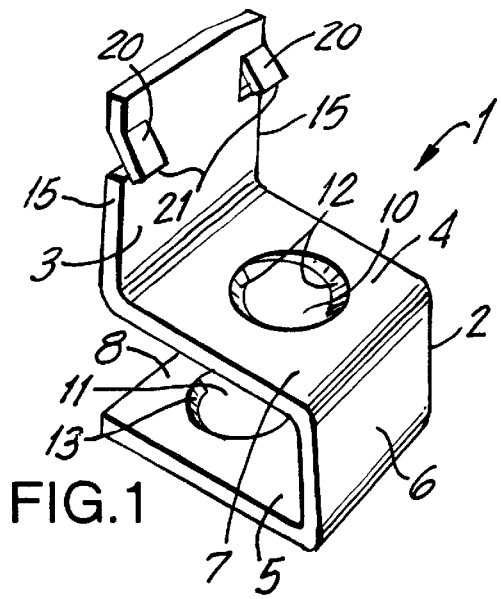
FIG. 1 is a perspective view of a clip made in accordance with the present invention.
Figure 2:
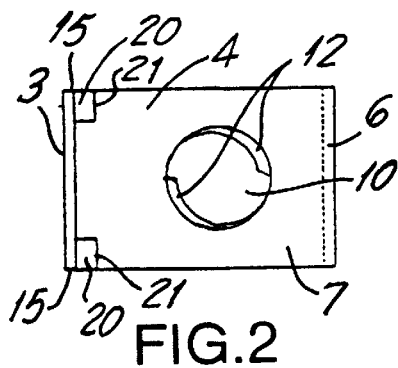
FIG. 2 is a top view of the clip shown in FIG. 1.
Figure 3:
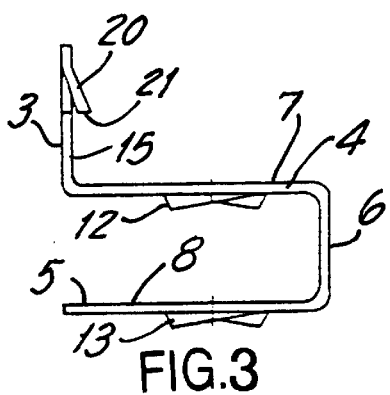
FIG. 3 is a side view of the clip shown in FIG. 1.
Figure 4:
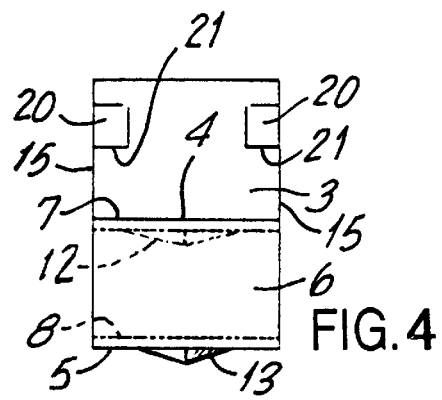
FIG. 4 is a rear view of the clip shown in FIG. 1.

Referring now to the drawings, with particular reference first to FIG. 1, there is shown a self-retaining snap-in clip constructed in accordance with the present invention. The clip comprises a generally U-shaped body portion 2 having spaced parallel upper and lower legs 4 and 5, respectively, connected together by a base 6 which is preferably at right angles to legs 4 and 5. The legs 4 and 5 each have an upper surface 7 and 8, respectively. An upstanding locking leg 3 extends upwardly from the upper leg 4 and is preferably substantially at a right angle thereto and substantially parallel to the base 6. Each leg 4 and 5 has a threaded opening 10 and 11, respectively, formed therein in axial alignment to each other. Each threaded opening 10 and 11 has outcroppings 12 an 13, respectively, adapted to receive the thread of a screw or bolt 9. The outcroppings 12 and 13 extend downwardly away from the upper surfaces 7 and 8 of the legs 4 and 5.

The upstanding locking leg 3 has a pair of locking tynes 20 extending from the locking leg 3 toward the base 6. The locking tynes 20 are preferably located at the outer edges 15 of the locking leg 3, however, there may be more than two tynes and they may be located at other locations without departing from the invention. The locking tynes 20 are resilient so that when flexed toward the locking leg 3 and then released, they will snap back outwardly toward the base 6 to their normal position. The locking tynes 20 have lower edges 21 which are spaced above the upper surface 7 of upper leg 4.

Figure 5:
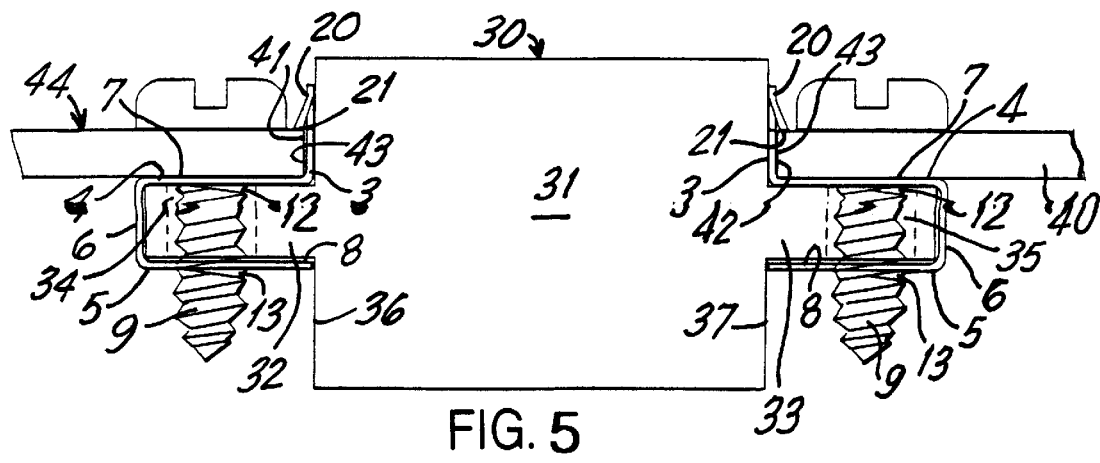
FIG. 5 is an elevational assembly view showing the clip in position for holding a fuse holder on a panel.

As shown in FIG. 5, the fuse holder 30 which is to be used with the present invention comprises a body portion 31 with a pair of flanges 32 and 33 extending from opposed side walls 36 and 37, respectively. The flanges 32 and 33 have openings 34 and 35 therein. The fuse holder 30 is to be mounted on a panel 40 through an opening 41 formed therein. The opening 41 has opposed edges 43 the distance between which is greater than the combined length of the body portion 31 of the fuse holder 30 and the thickness of the upstanding locking legs 3 of a pair of clips 1. The flanges 32 and 33 are inserted between the legs 4 and 5 of the clips 1 with one clip positioned on each flange 32 and 33. The downwardly extending outcroppings 12 of the screw-thread openings 10 in the upper leg 4 bear against the top surfaces of the flanges 32 and 33 to hold them and the body portion 31 securely in place. It will be noted that the upstanding locking legs 3 of each clip 1 lie against the side walls 36 and 37 of the body portion 31 with the tynes 20 facing away from the side walls 36 and 37. In this position, the body portion 31 with the upstanding locking leg 3 of each clip 1 lies in the space 42 formed between the edge 43 of opening 41 and the body portion 31 of the fuse holder 30. The locking leg 3 is pushed through this space 42 and the locking tynes 20 are compressed until they clear and move past the top surface 44 of the panel 40 at which point they will snap out away from the locking leg 3 to cause the lower edges 21 of the locking tynes 20 to engage the top surface 44 of the panel 40. This will lock the clips 1 in place with the fuse holder 30 held in place with its flanges 32 and 33 held between the legs 4 and 5 of each clip 1 and with the panel 40 held between the top surface of the upper legs 4 of the clips 1 and the lower edges 21 of the locking tynes 20. It will be understood that the length or position of the tynes 20 is such that the lower edges of the tynes 20 are spaced above the top leg 4 a distance substantially equal to, or slightly greater than, the thickness of the panel 40 into which the fuse holder 30 is to be mounted. This distance may change depending on the thickness of the panel 40. For added security, retainer screws 9 may be screwed into the panel 40 and through openings 10 and 11 in the spaced legs 4 and 5 of the clip and the outcroppings 13 will engage the threads of the screws 9 to hold the screws 9 in place.

Although the invention has been described and illustrated with a certain degree of particularity, several obvious changes and modifications are suggested from the description herein. Such changes and modifications are nevertheless within the scope of the present invention.

What is claimed is:

1. A clip comprising a body portion, said body portion comprising a pair of spaced first and second legs, a base connecting the legs together, an upstanding locking leg extending upwardly from said first leg in a direction away from said second leg and holding means mounted on the locking leg.

2. A clip as set forth in claim 1 wherein said first and second legs are substantially parallel to each other.

3. A clip as set forth in claim 2 wherein said base is substantially perpendicular to said first and second legs.

4. A clip as set forth in claim 3 wherein said holding means comprise means to hold a support means between the holding means and the upper leg.

5. A clip as set forth in claim 4 wherein said locking leg extends upwardly from said first leg and is at right angles thereto.

6. A clip as set forth in claim 5 wherein said holding means comprises at least one locking tyne, extending away from the locking leg and towards said base in overlying relationship to said first leg.

7. A clip as set forth in claim 6 wherein said locking tyne is resilient.

8. A clip as set forth in claim 7 wherein said locking tyne has a lower edge which is spaced above the upper surface of the first leg.

9. A clip as set forth in claim 8 wherein more than one locking tyne is provided on said locking leg.

10. A clip as set forth in claim 9 wherein each of said first and second leg has an opening therein.

11. A clip as set forth in claim 10 wherein the openings in said first and second legs have thread outcroppings.

12. A clip as set forth in claim 11 wherein each of said legs has an opening therein, which are in axial alignment to each other.

13. A clip as set forth in claim 12 wherein said thread outcroppings extend to a position below the first said leg.

14. A clip as set forth in claim 13 wherein the second leg opening has thread outcroppings.

15. A clip as set forth in claim 14 wherein said body portion is unshaped and is integral with said locking leg.

* * * * *